(No Model.)
D. MANWARING.
CATTLE STANCHION.
No. 364,030. Patented May 31, 1887.
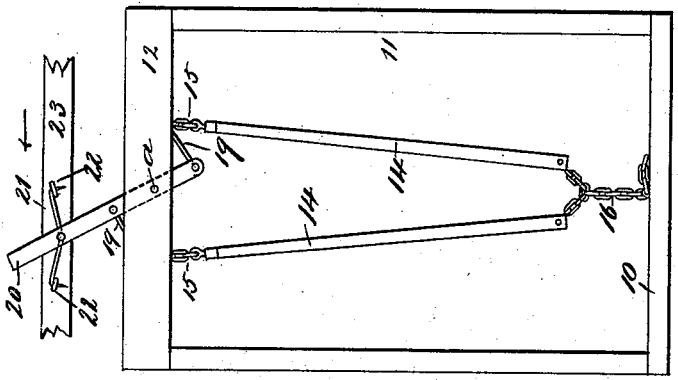
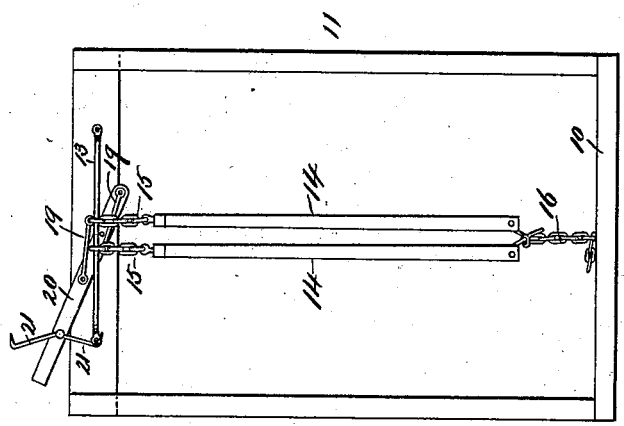
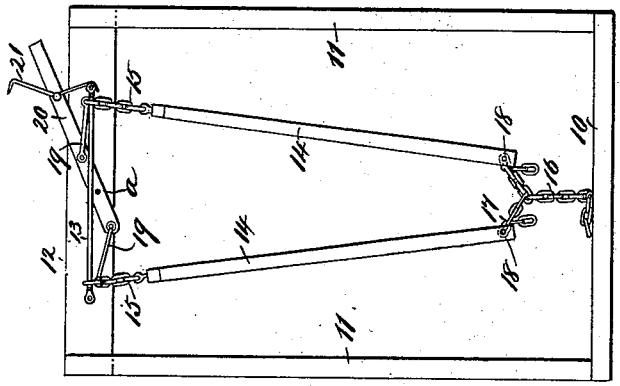
WITNESSES:
F. McArdle
C. Sedgwick
INVENTOR:
D. Manwaring
BY Munn & Co.
ATTORNEYS.

UNITED STATES PATENT OFFICE.

DWIGHT MANWARING, OF ALGONA, IOWA.

CATTLE-STANCHION.

SPECIFICATION forming part of Letters Patent No. 364,030, dated May 31, 1887.

Application filed January 11, 1887. Serial No. 224,066. (No model.)

*To all whom it may concern:*

Be it known that I, DWIGHT MANWARING, of Algona, in the county of Kossuth and State of Iowa, have invented a new and Improved Cattle-Stanchion, of which the following is a full, clear, and exact description.

This invention relates to a novel form of cattle stanchion, wherein the parts are so arranged that the neck-bars are yieldingly mounted, and consequently the comfort of the animal is greatly increased.

Reference is to be had to the accompanying drawings, forming a part of this specification, in which similar figures of reference indicate corresponding parts in all the views.

Figure 1 is a face view of the stanchion, representing the parts as they appear when the neck-bars are moved to permit the animal to withdraw its head. Fig. 2 is a similar view, the parts being represented as they appear when the neck-bars are moved together or closed; and Fig. 3 is a view of the opposite side of the device, representing the neck-bars as they appear when adjusted for use.

In the drawings above referred to, 10 represents a base plate or beam that is spiked or otherwise secured to the floor of the stable. To the base-plate 10 there are secured vertical standards 11, which carry an upper cross-bar, 12.

To one face of the cross-bar 12 there is connected a rod, 13, from which there are suspended neck-bars 14, connection between the rod 13 and the neck-bars being established by means of chains 15, the rod 13 passing through the upper links of the chain, as indicated. The lower ends of the neck-bars 14 are adjustably connected by means of a chain, 16, that is provided with a branch, 17, the neck-bars being brought into engagement with the proper links of the main and auxiliary chains by means of pins 18, that are passed through the lower ends of the bars and through the links, as indicated.

The chains 15 are connected to a lever, 20, by means of links 19, said lever 20 being pivotally connected at *a* to the upper cross-bar, 12. To this lever 20 there is connected a double-pronged hook, 21, which may be brought into engagement with one end of the rod 13, as indicated in Fig. 1, to hold the neck-bars in the open position, or with the other end of the rod, as shown in Fig. 2, when it is desired to hold the neck-bars in a closed position; and when the neck-bars are to be held in the position in which they are shown in Fig. 3, the prongs of the hooks 21 are brought into engagement with the staples or eyes 22, that are carried by a strip, 23, or fixed to any proper permanent support.

When it is desired to simultaneously open or close said stanchions, I employ such a strip as 23, which is arranged as indicated in Fig. 3, being supported in proper bearings. By moving this strip in the direction of the arrow shown in Fig. 3, the neck-bars will be opened and the animals released.

With such a stanchion as has been described it will be seen that the animal will have a certain amount of play and freedom, owing to the novel manner in which the neck-bars are arranged.

Having thus fully described my invention, I claim as new and desire to secure by Letters Patent—

1. A stanchion comprising a frame having a horizontal rod on its top cross-piece, neck-bars having separate independent flexible connections at their upper ends sliding laterally on the said horizontal rod, and a lever for operating and locking said connections, the lower ends of the neck-bars being connected to the floor or base, substantially as set forth.

2. The combination, with a vertical frame, of neck-bars suspended therefrom by separate chains and connected to each other and the lower portion of the frame by other chains, substantially as described.

3. The combination, with a vertical frame carrying a horizontal rod, 13, of chains arranged to slide upon said rod, neck-bars connected to the chains, means for drawing the chains toward each other and locking the bars in place, and a main and auxiliary chain connected to the lower ends of the neck-bars, the main chain being connected to the lower part of the frame, substantially as described.

4. The combination, with a vertical frame, of a horizontal rod carried thereby, chains arranged to slide upon the rod, neck-bars connected to the chains and to the lower portion of the frame, a lever pivotally connected to the upper cross-bar of the frame, links connecting the lever and the upper suspending-chains, and a locking device, substantially as described.

DWIGHT MANWARING.

Witnesses:
F. M. TAYLOR,
GUY L. TAYLOR.